June 18, 1940.   N. ESKILSON   2,204,730
MEASURING CUP
Filed April 7, 1939
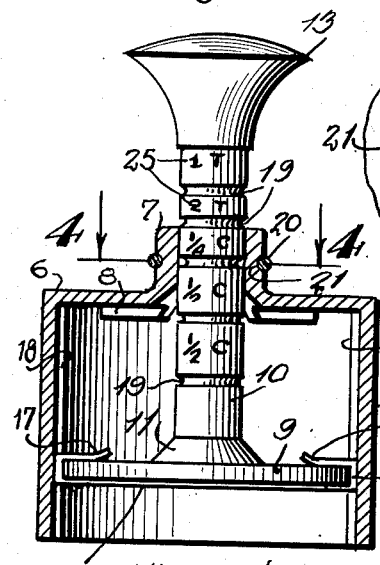
Fig. 1.
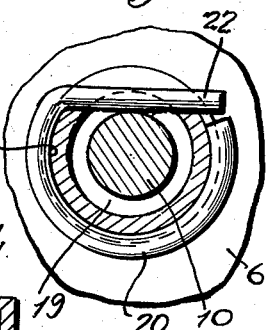
Fig. 4.
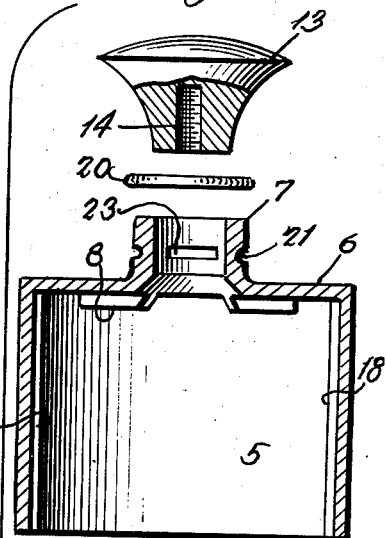
Fig. 6.
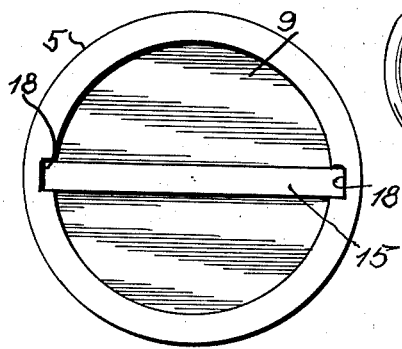
Fig. 2.
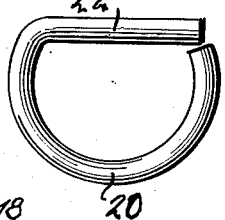
Fig. 5.
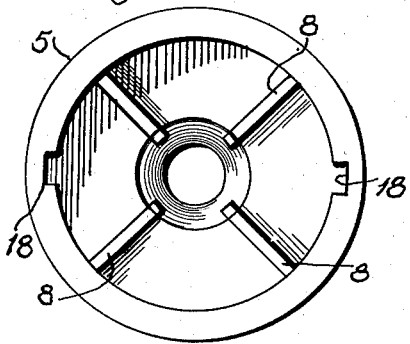
Fig. 3.
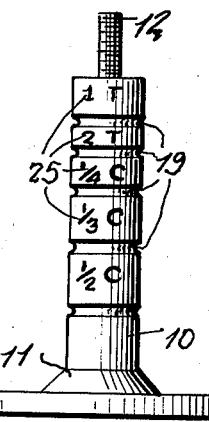
Inventor
Nils Eskilson
By Bryant & Lowry
Attorneys Patented June 18, 1940

2,204,730

UNITED STATES PATENT OFFICE 2,204,730

MEASURING CUP

Nils Eskilson, Huntington Park, Calif.

Application April 7, 1939, Serial No. 266,638

3 Claims. (Cl. 73—165)

This invention relates to improvements in measuring cups.

The primary object of this invention is to provide a measuring cup for measuring quantities of pulverulent and other material in which the measuring area of the cup may be varied by means of an adjustable bottom wall actuated by a calibrated operating rod.

A further object of this invention is to provide an adjustable measuring cup having a movable wall capable of being rotated and carrying a scraper or remover which remains stationary with respect to the measuring receptacle while the movable bottom wall is rotated.

A further object of this invention is to provide an adjustable measuring cup having an adjustable bottom wall which may be moved to several different positions in accordance with the measuring capacity desired and held in position, by means of a spring clip detent.

A further object of this invention is to provide a measuring cup which may be adjusted to receive various standard quantities of measured material thereby requiring the use of only a single measuring vessel in measuring various quantities.

Other objects and advantages of the invention will become apparent during the course of the following description taken with accompanying drawing wherein, Figure 1 is a vertical cross-sectional view of the device embodying this invention, illustrating the measuring cup and the adjustable bottom wall therefor;

Figure 2 is a bottom plan view of the measuring cup showing the manner in which the scraper is associated with adjustable wall;

Figure 3 is a bottom plan view of the measuring cup illustrating the movable bottom wall removed;

Figure 4 is a horizontal cross-sectional view taken on line 4—4 of Figure 1, looking in the direction of the arrows, illustrating the spring clip for holding the adjustable bottom wall in a predetermined position;

Figure 5 is a top plan view of the spring clip detent; and

Figure 6 is an exploded view of the adjustable measuring cup, illustrating the parts in their respective relation.

In the drawing, the reference character 5 will generally be employed to designate a measuring cup formed of suitable material closed at one end as at 6 with the opposite end open. A central opening in the end wall 6 of the cup is surrounded by an outwardly extending tubular boss 7 and radial reinforcing ribs 8 on the inner face of the end wall 6 extend from the tubular boss 7 to the side wall of the cup 5 to strengthen the structure.

Slidably mounted in the cup 5 is a piston-shaped member 9 forming an adjustable false bottom wall within the cup 5 whereby the capacity of the cup may be increased by moving the adjustable false bottom 9 toward the end wall 6.

A slide rod 10 is connected to the false bottom 9 by a conical portion 11 while the free end of the slide rod extends through the tubular boss 7 and is slidably mounted therein. The upper end of the slide rod 10 is reduced and screw threaded as at 12 for receiving a knob 13 having a central screw threaded opening 14 for receiving the screw threaded reduced portion 12.

Secured to piston-shaped member 9 is a scraper blade 15, the free ends of which are angularly bent as at 16 and then inwardly bent as at 17 to embrace the peripheral edge of the piston-shaped member 9. The angularly bent ends 16 of the scraper blade 15 are received in diametrically opposite slots 18 formed on the inner wall of the cup 5. The slots 18 allow the scraper blade 15 to travel longitudinally with the false bottom 9 but allows free rotary movement of the false bottom relative to the scraper blade.

On the intermediate portion of the slide rod 10, there is formed a series of annular grooves 19 adapted to selectively receive a spring detent 20 having a circular portion mounted in an annular groove 21 formed in the tubular boss 7 with the free straight end 22 projecting through an opening 23 or cut away portion of the annular groove 21 to engage in an annular groove 19 to retain the rod in one of its adjusted positions.

The slide rod 10 is provided with graduations 25 between the annular grooves, indicating the capacity of the measuring cup 5 when the slide rod 10 and piston-shaped bottom wall have been moved to the desired position to produce the desired measuring cup capacity, in accordance with the graduations 25 on the slide rod 10.

When the slide rod 10 is positioned so that the detent 22 engages one of the annular grooves 19, the graduation visible above the annular boss 7 will denote the capacity of the measuring cup. After the device is filled with the material to be measured, it may be easily removed by rotating the knob 13 while holding the cup 5 stationary, thereby causing the scraper blade 15 to separate the material from the surface of the false bottom 9 and effect a release of the measured material.

It is to be understood, that the form of the invention herewith shown and described is to be taken as a preferred embodiment of the invention and that various changes in the shape, size and arrangement of parts may be resorted to without departing from the spirit and scope of the invention as claimed.

I claim:

1. In a measuring cup of the character described, wherein the cup has an annular side wall and an end wall, wherein a rod rotatably and slidably extends through the end wall, wherein an adjustable false bottom for the cup is fixed to the inner end of the slide rod and wherein cooperating means are carried by the end wall of the cup and slide rod for holding the false bottom in adjusted position, a scraper blade freely mounted on the false bottom in contact with the exposed side thereof and said scraper blade having a sliding interlocking connection with the annular side wall of the cup whereby the false bottom may be rotated by the slide rod with the scraper blade remaining stationary.

2. In a measuring cup of the character described, wherein the cup has an annular side wall and an end wall, wherein a rod rotatably and slidably extends through the end wall, wherein an adjustable false bottom for the cup is fixed to the inner end of the slide rod and wherein cooperating means are carried by the end wall of the cup and slide rod for holding the false bottom in adjusted position, a scraper blade freely mounted on the false bottom in contact with the exposed side thereof and comprising a metallic strip having upwardly and inwardly directed return-bent ends overlying the false bottom with the upwardly bent end portions of the strip projecting outwardly of the peripheral edge of the false bottom and a sliding interlocking connection between the outwardly projecting end portions of the strip and the annular side wall of the cup.

3. In a measuring cup of the character described, wherein the cup has an annular side wall and an end wall, wherein a rod rotatably and slidably extends through the end wall, wherein an adjustable false bottom for the cup is fixed to the inner end of the slide rod and wherein cooperating means are carried by the end wall of the cup and slide rod for holding the false bottom in adjusted positions, a scraper blade freely mounted on the false bottom in contact with the exposed side thereof and comprising a metallic strip having upwardly and inwardly directed return-bent ends overlying the false bottom with the upwardly bent end portions of the strip projecting outwardly of the peripheral edge of the false bottom, the inner face of the side wall of the cup having diametrically opposite horizontally extending grooves therein for the sliding interlocking reception of the outwardly projecting end portions of the strip.

NILS ESKILSON.